(12) United States Patent
Vasilantone

(10) Patent No.: US 6,698,395 B1
(45) Date of Patent: Mar. 2, 2004

(54) HYBRID ROTARY ENGINE

(76) Inventor: Michael M. Vasilantone, 524B Norwich Ct., Manchester, NJ (US) 08759

( * ) Notice: Subject to any disclaimer, the term of this patent is extended or adjusted under 35 U.S.C. 154(b) by 0 days.

(21) Appl. No.: 10/273,532

(22) Filed: Oct. 21, 2002

(51) Int. Cl.⁷ .................................................. F02B 53/00
(52) U.S. Cl. ......................... 123/243; 60/698; 60/716; 60/720
(58) Field of Search .................... 60/698, 716, 719, 60/720; 123/241, 243

(56) References Cited

U.S. PATENT DOCUMENTS 3,852,963 A * 12/1974 Hufstader .................... 60/717
3,869,863 A * 3/1975 Juge .......................... 60/39.19
3,971,347 A * 7/1976 Vasilantone ................. 418/147
4,307,695 A * 12/1981 Vasilantone .............. 123/559.1
4,742,683 A * 5/1988 Heminghous et al. ......... 60/716
5,161,378 A * 11/1992 Murray et al. ................ 60/718

* cited by examiner

Primary Examiner—Hoang Nguyen
(74) Attorney, Agent, or Firm—Charles I. Brodsky

(57) ABSTRACT

A hybrid engine including an electric generator, an electric motor, and a rotary internal combustion engine including pivoted vane elements mounted on a rotor and biased into engagement to sequentially form intake, compression, combustion and exhaust chambers between the rotor and its annular wall.

7 Claims, 8 Drawing Sheets

HYBRID ROTARY ENGINE

CROSS-REFERENCE TO RELATED APPLICATIONS

None

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to hybrid engines combining electric motors and generators with combustion engines, in general, and to a hybrid engine in which the motor and generator is combined with a rotary internal combustion engine, in particular.

2. Description of the Related Art

As is well known and understood, automotive manufacturers are either producing or developing automobiles with hybrid engines which combine electrical power with internal combustion engines. In these designs, the generator constantly charges the vehicle's batteries, while increasing revolutions during moments of deceleration increases the charging of the batteries and the braking forces applied to the drive shaft. There, the electric motor always assists the engine during vehicle acceleration, but at the same time always senses the drive shaft load in reacting on demand; in these configurations, the electric motor also acts as a primary driver in preventing battery over-charge.

SUMMARY OF THE INVENTION

As will become clear from the following description, the present invention provides a hybrid engine which combines an electric motor and generator with a rotary internal combustion engine. As will be seen more specifically, the hybrid engine utilizes a rotary internal combustion engine which incorporates features of my prior U.S. Pat. No. 3,971,347 (issued Jul. 27, 1976) and U.S. Pat. No. 4,307,695 (issued Dec. 29, 1981).

As is known, the main benefits to be derived from rotary internal combustion engines relative to reciprocating piston engines are that they are comprised of fewer operating parts, can be run on a number of different fuels, are more compact and are more efficient:

a) My U.S. Pat. No. 3,971,347 describes a rotary internal combustion engine housing and a concentrically arranged chamber within the housing in receiving an eccentrically disposed cylindrical rotor; the rotor cooperates with the chamber to define a crescent-shaped chamber which is sequentially divided into intake, compression, combustion and exhaust chambers by means of vanes which are pivotally mounted on the annular surface of the rotor and which engage the inner surface of the housing in defining the chamber. The resulting configuration provides efficiency of operation, effective sealing between the rotor and the housing, effective minimalization of heat build up due to frictional contact, and a great rigidity and strength.

b) My second U.S. Pat. No. 4,307,695 provides enhanced operation by having a blower and/or superchargers that are driven by the rotary engine. The design includes a rotor, a plurality of pistons angularly mounted in the rotor, an actuator mounted for eccentric rotation relative to the access of rotation of the rotor, a blower, a transverse actuator pin connecting each piston to the actuator, and a plurality of fixed pins connecting the rotor to the actuator. With the fixed pins mounted on the rotor so as to pass through clearance holes in the blower in carrying extension gears which mate with internal gears mounted in the actuator, rotation of the rotor causes rotation of the blower and of the actuator as well. As there set forth, the rotational force that results changes the pressure line in its direction, moving it towards the direction of rotation as the rotational speed increases.

As will become clear from the following description, the hybrid engine of the present invention includes the basic configuration of my U.S. Pat. No. 4,307,695 patent—but, instead of employing its pistons, utilizes the pivoting vane concept of my U.S. Pat. No. 3,971,347 patent albeit somewhat modified. Also, in so doing, the blower and supercharger of my later design is eliminated—leading to the end result of a very small engine yet with a comparable amount of power as with hybrid engines utilizing standard cylinder engines.

BRIEF DESCRIPTION OF THE DRAWING

These and other features of the present invention will be more clearly understood from a consideration of the following description, taken in connection with the accompanying drawings in which.

DETAILED DESCRIPTION OF THE INVENTION

Figure 1:
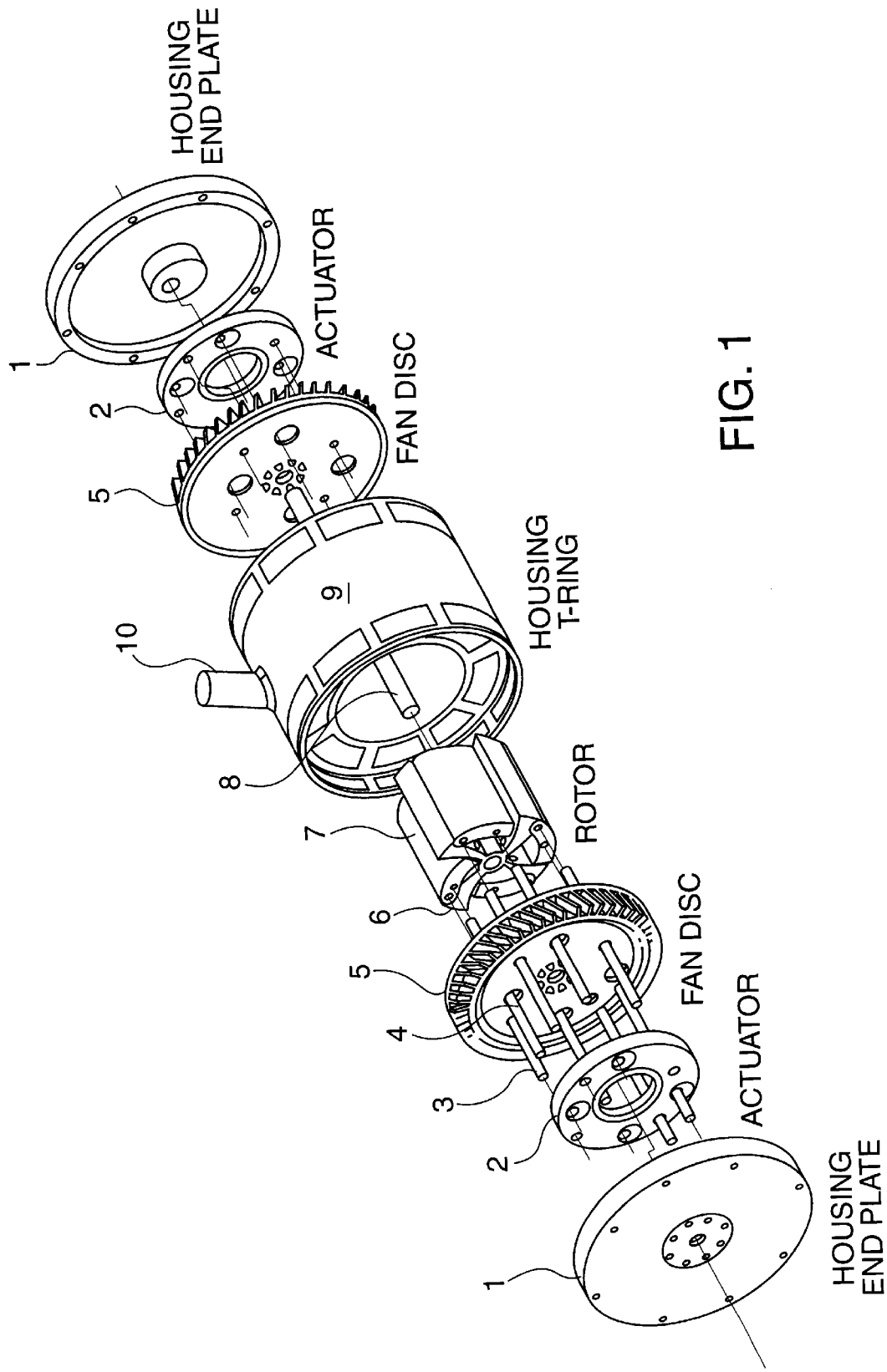
FIG. 1 is a pictorial view of a rotary engine modified in accordance with the teachings of the present invention.
Figure 2:
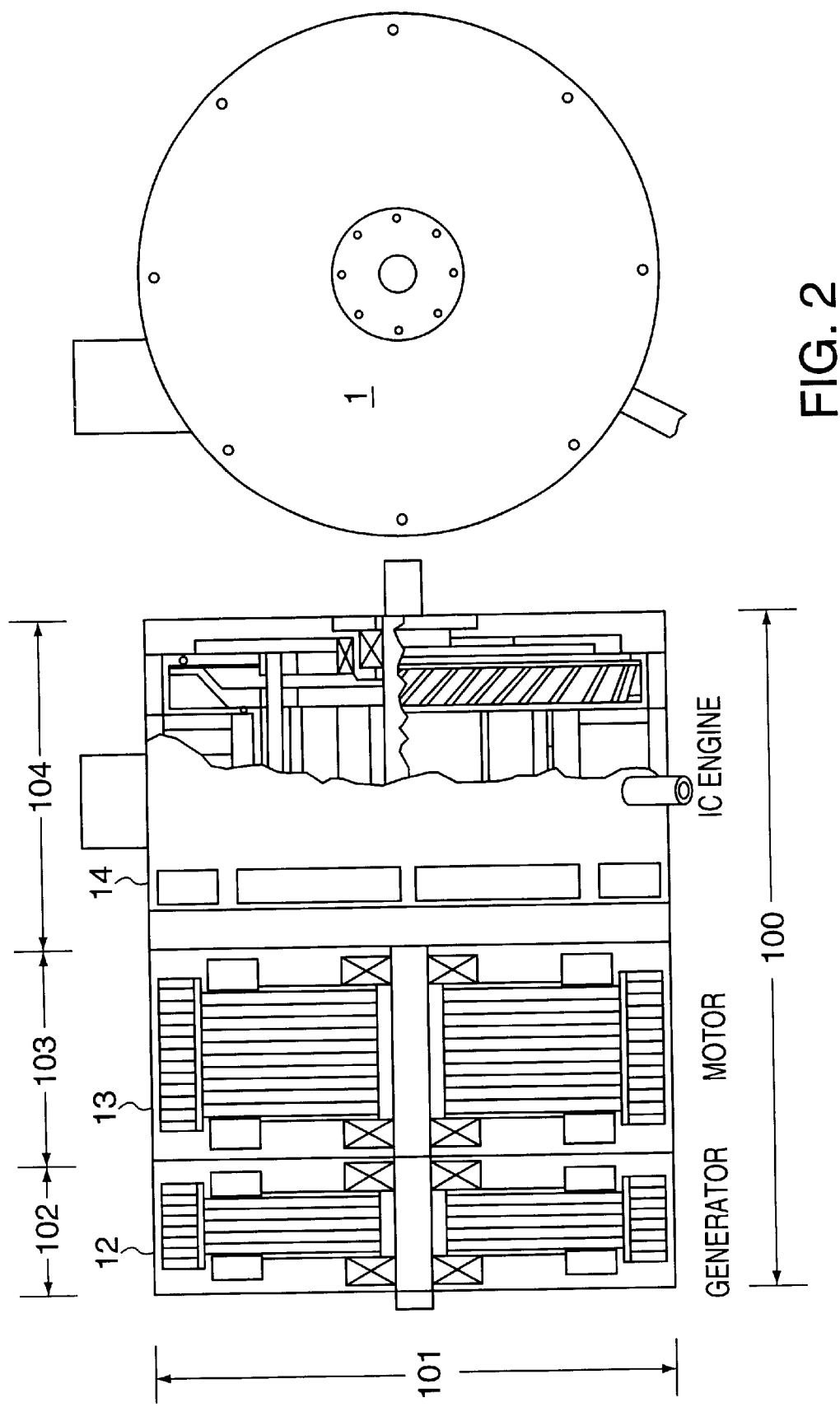
FIG. 2 is a cross-sectional view of the three elements which make up the drive system in a hybrid automobile embodying the invention—a generator, a motor, and the rotary engine of FIG. 1.

Referring to the exploded view of the rotary engine 14 of the invention shown in FIG. 1, reference numeral 1 identifies its housing end plate, reference numeral 2 identifies its actuator, reference numeral 3 depicts its fixed pins, and reference numeral 4 shows its actuating pins. The fan disc of the engine is shown at 5, the rotor is shown at 6, and the pivoting vanes are shown at 7—all riding on a shaft 8 extending through a T-ring 9. The exhaust outlet for the engine is then shown at 10. Coupled together as a hybrid engine 14 with an electric generator 12 and electric motor 13, the hybrid engine of the invention may be of a depth 100 of some 24 inches, and a height 101 of some 8 inches. The depths of the generator (102), the motor (103) and the rotary engine (104) may be of the order of 5 inches, 7 inches and 12 inches, respectively—all as shown in FIG. 2 along with the end plate 1.

Figure 3:
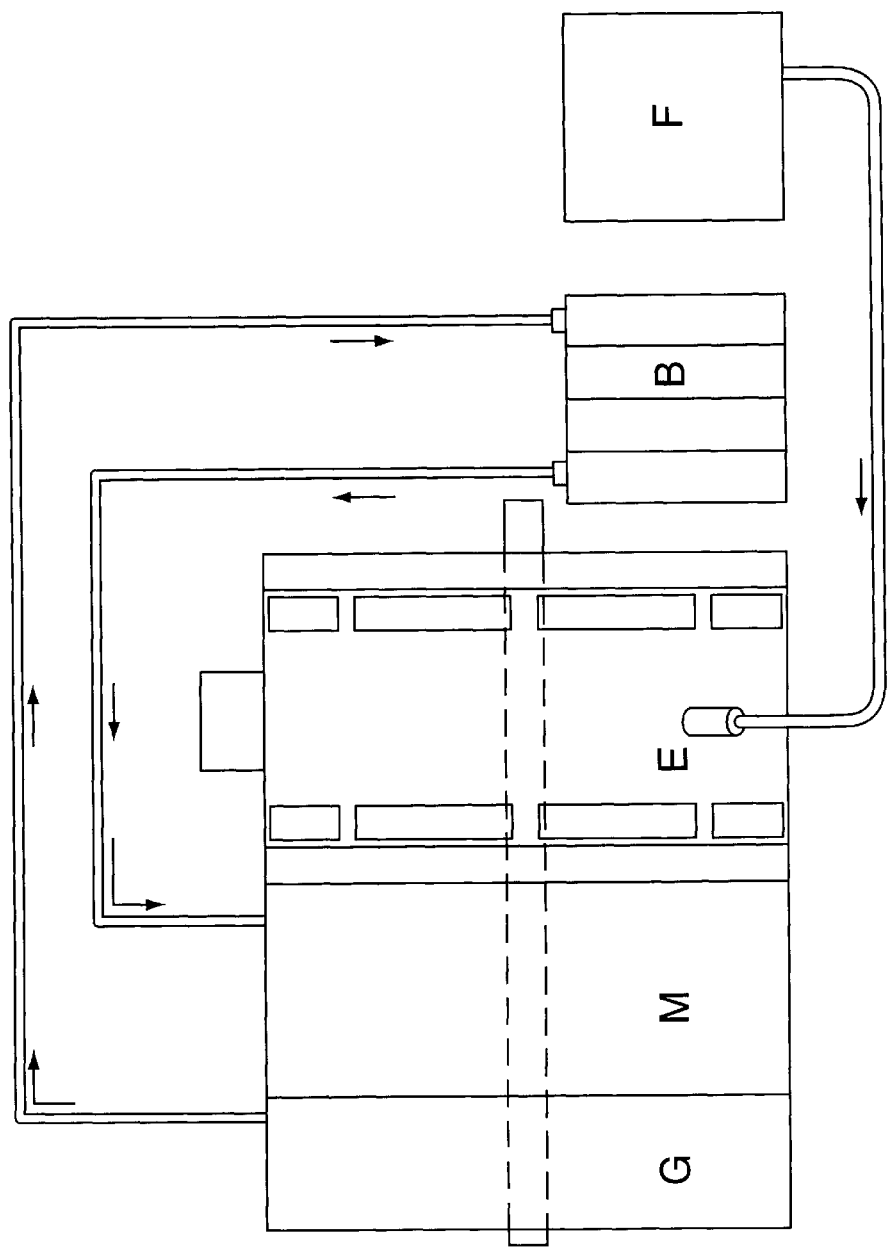
FIG. 3 is a diagrammatical view of the automotive drive system including the battery bank and the fuel tank, indicative of how they function together.

In the drive system illustrated in FIG. 3, electrical power from a battery bank 17 travels along a path 16 to the motor 13, whereas the generator 12 charges the battery bank 17 along a path 15, each as indicated in the direction of the arrows. A fuel tank 18 supplies gasoline or other fuel to the engine 14 along a fuel line 19, in the direction of its own respective arrow.

As will be appreciated by those skilled in the art, the cross-sectional view of the rotary engine 14 (FIG. 4) includes a fuel injector 11, an actuator bearing 20, a rotor bearing 21, an eccentric 22, a double bearing 23, pairs of fan seals 24, and pairs of ring seals 25. Reference numeral 26 identifies the oil ports included in the rotor 6. Reference numeral 8 continues to show the shaft of the rotary engine.

Figure 5:
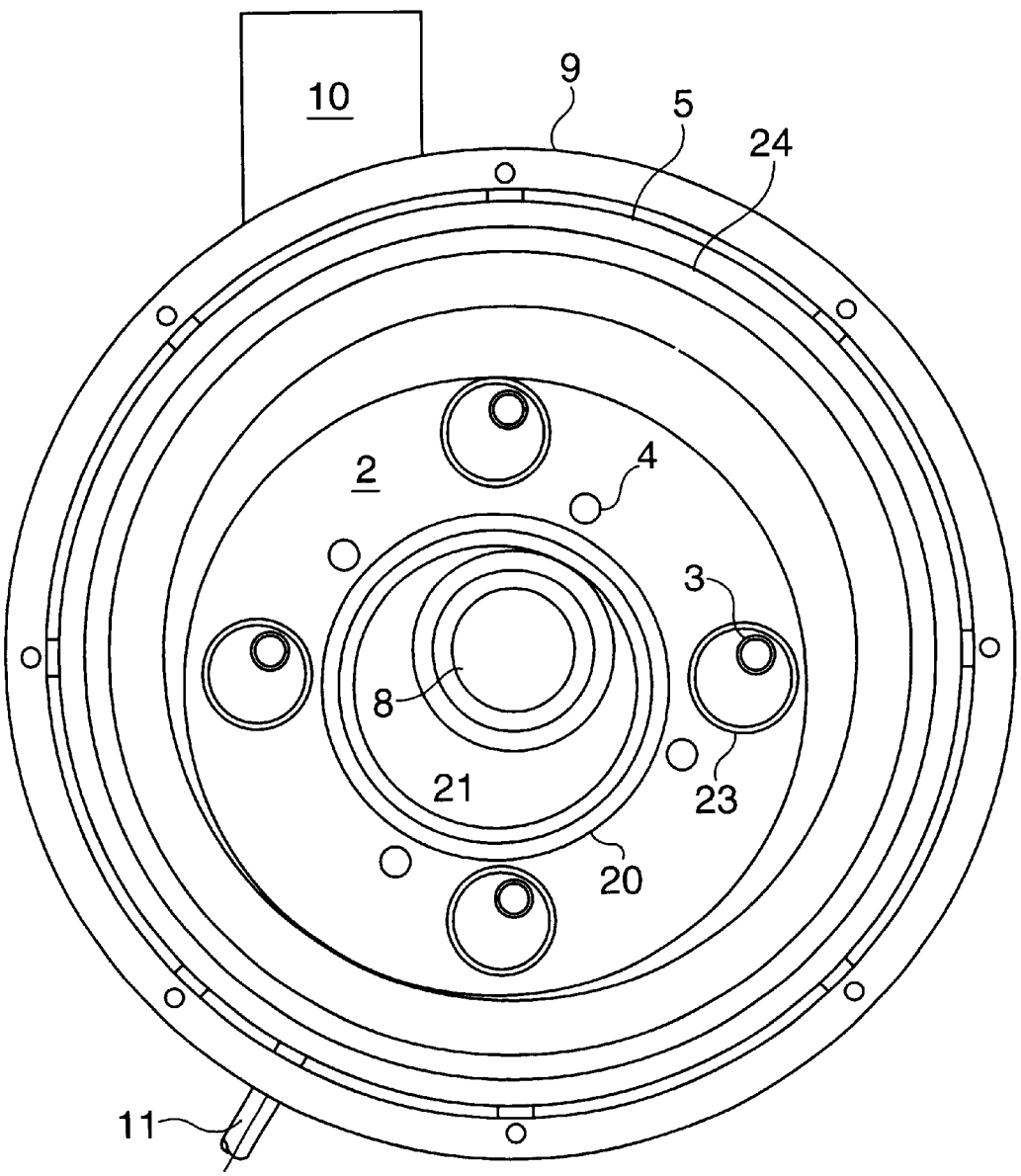
FIG. 5 is a sectional view of the rotary engine taken along its actuator.
Figure 6:
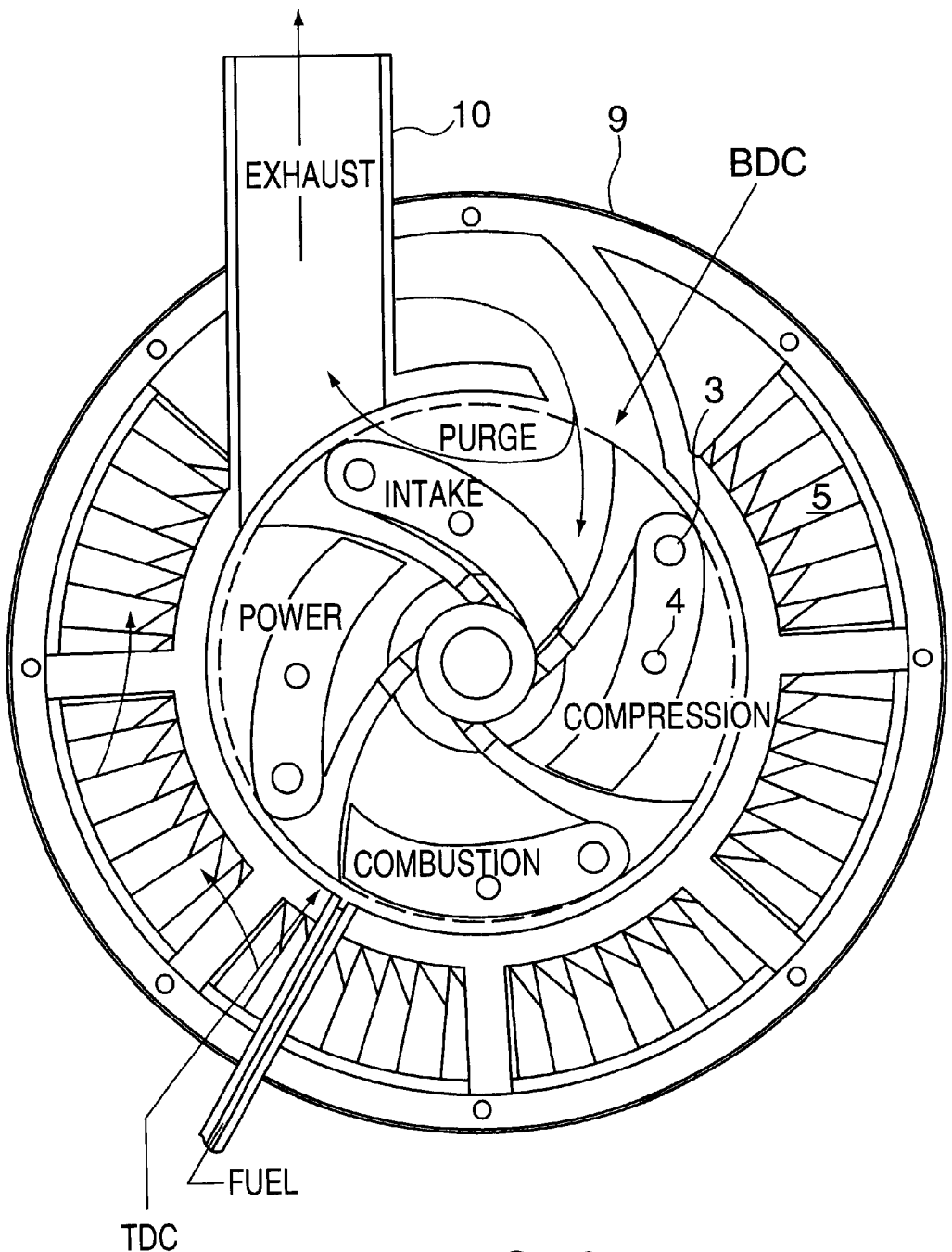
FIG. 6 is a sectional view of the engine of FIG. 1 with its vanes in the 4 phases of intake, compression, combustion and exhaust while the intake vane is in the purging mode and the combustion vane is at top dead center (TDC)
Figure 7:
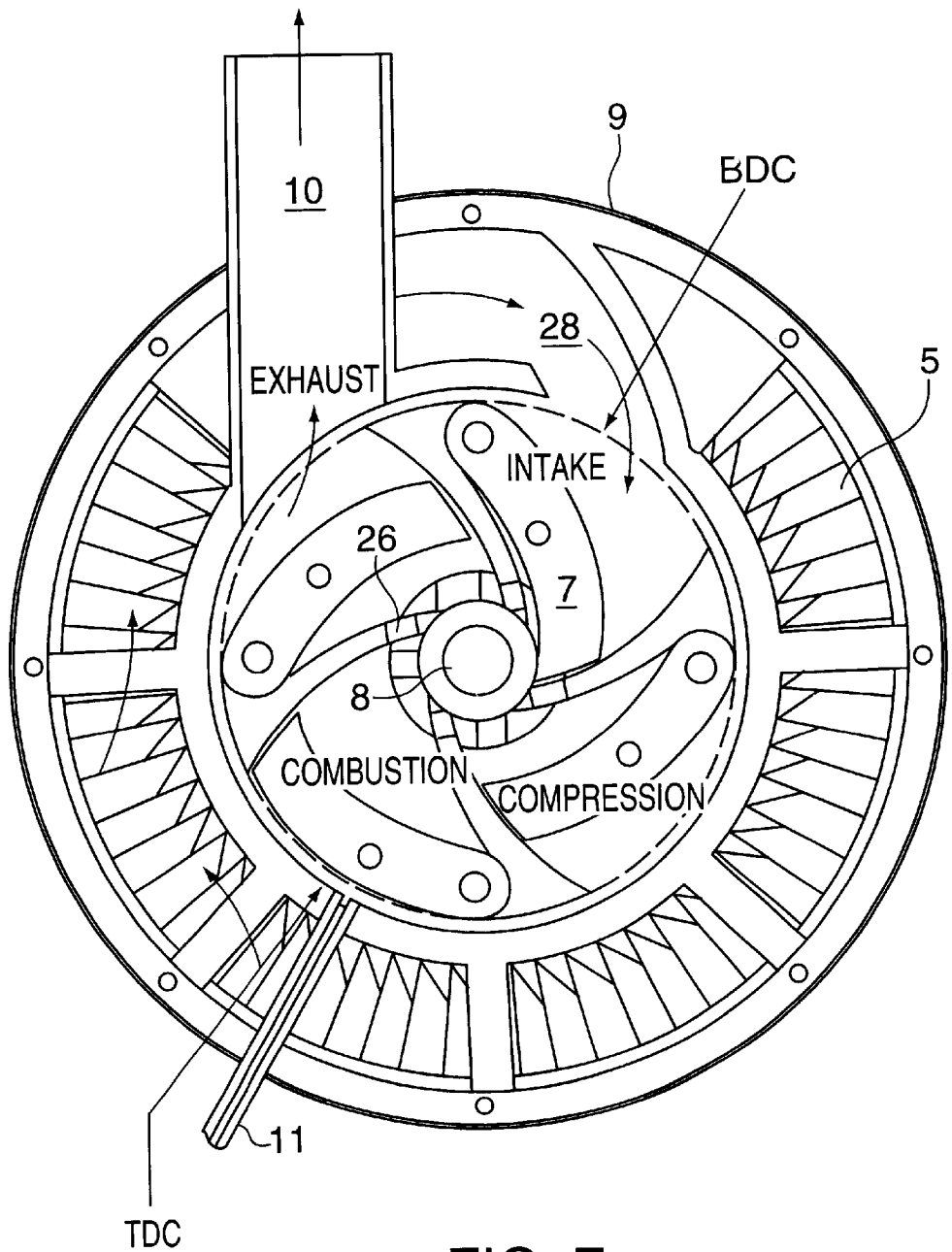
FIG. 7 is a sectional view of the engine with the intake vane at bottom dead center (BDC), while the combustion vane proceeds through its power phase.

FIG. 5 then shows a sectional view of the rotary engine of the invention taken at the actuator 2, along the line A—A. FIG. 6 shows a sectional view taken at the rotor 6, along the line B—B, with the four vanes 7 in their phases of intake, compression, combustion and exhaust, and while the intake vane is in the purging mode and the combustion vane is at top dead center (TDC). Reference numeral 27 identifies the intake at the purge position, with the compression, combustion and power phases indicated clockwise. The "fuel" and "air" inputs are as indicated, with the notation BDC representing the bottom dead center position. FIG. 7, on the other hand, shows the same section view at the rotor 6 along the line B—B with the intake vane the bottom dead center (BDC) position and the combustion vane proceeding through the power phase. The intake vane at the bottom dead center (BDC) position is shown at 28.

Figure 4:
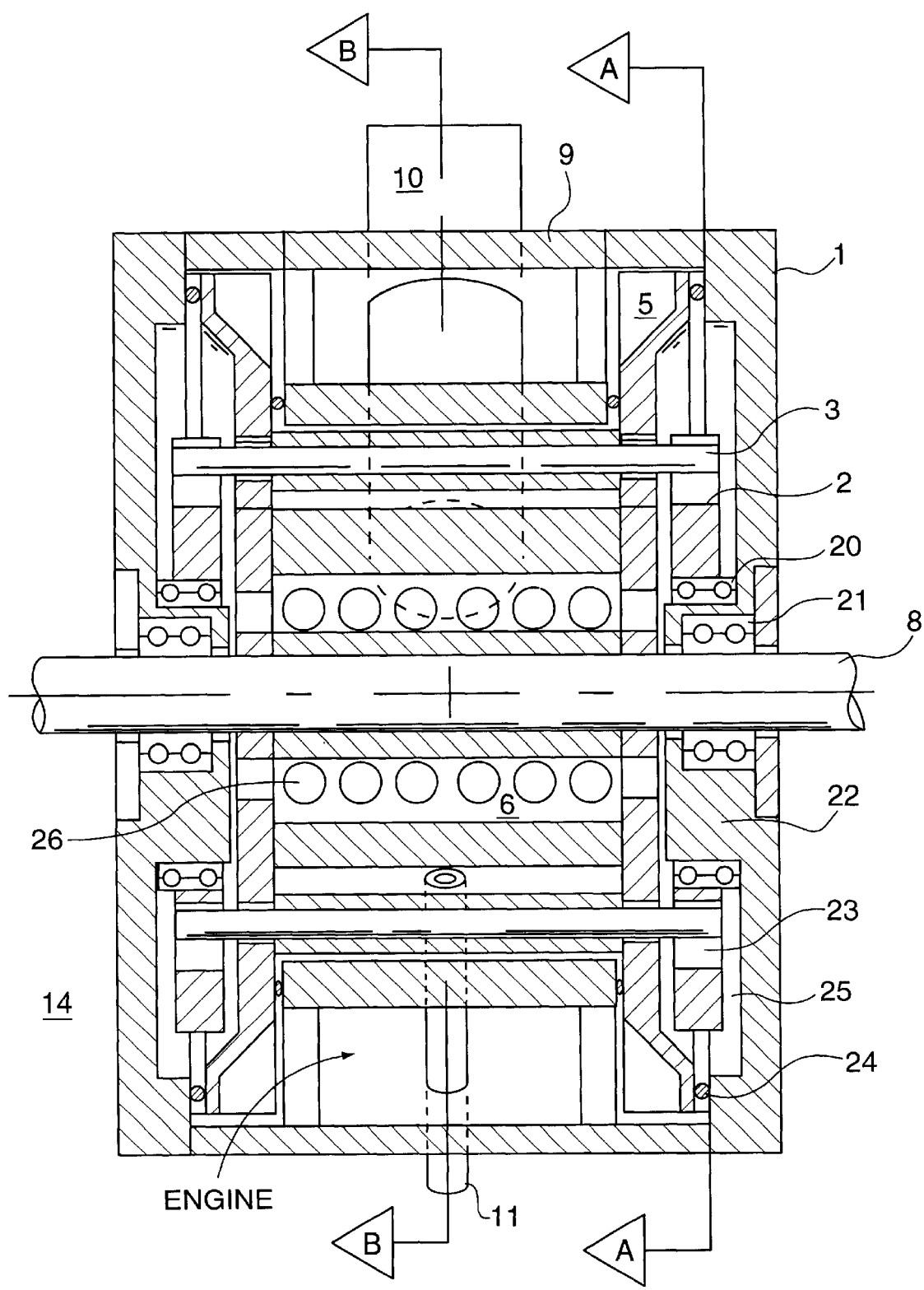
FIG. 4 is a cross-sectional view of the rotary engine of FIG. 1.
Figure 8:
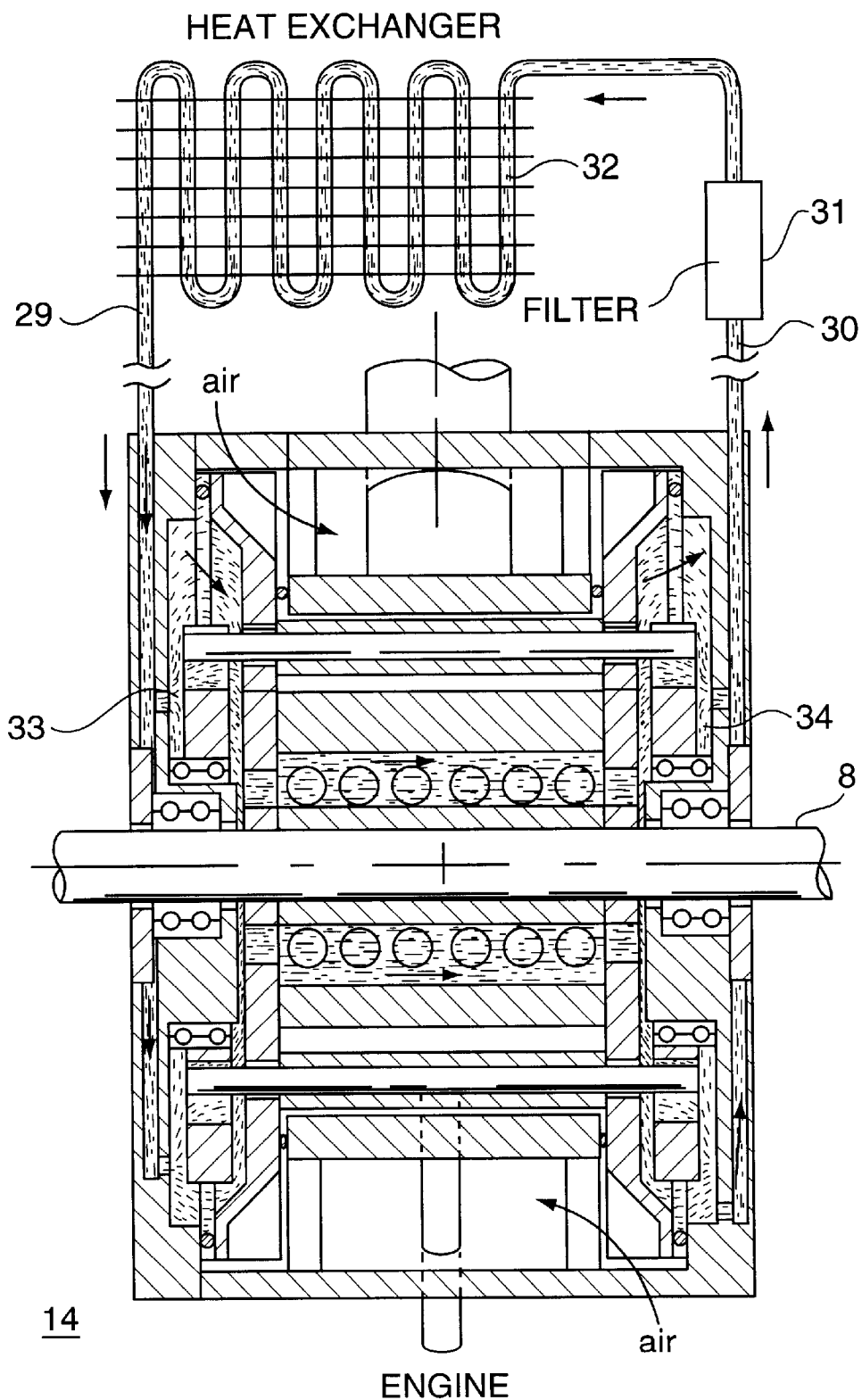
FIG. 8 shows a combined cooling and lubricating system for the rotary engine of FIG. 1.

Adding the cooling and lubricating system with the rotary engine of FIG. 4 provides the view of FIG. 8 in which reference numeral 29 identifies the oil inlet, reference numeral identifies the oil outlet, the filter is shown at 31, the heat exchanger shown at 32 and its "in" and "out" pumps shown at 33, 34, respectively. Again, the various arrows signify the flow of the coolant and lubricating fluids, in typical fashion.

As a reading of my above-noted patents will show, the rotary engine design of this invention utilizes both the pivotal vanes of the earlier patent with the actuator system of the later patent. With the cylinders of the later patent and with its blower and supercharger removed, the rotary engine of the invention becomes the primary driving force and the fuel the primary power medium—with all the other elements assisting the engine except during moments of demand. Each vane 7 will be seen to have a fixed pin which supports its pivoting action, while at the same time, stabilizes the rotary action of the rotor by terminating into the actuator through a double acting bearing. Each vane 7 also includes an actuator pin to provide a reciprocal action to each vane for each revolution.

In operation, the rotor, through supercharging by way of the rotor fan discs, undergoes the normal four stages of intake, compression, combustion and exhaust during each revolution. A crossover scavenging of the exhaust gases prior to full intake initiates the intake stage, as shown in FIG. 6. The combustion stage can be spark or diesel generated—and the absence of intake and exhaust valves aids dramatically in avoiding sequencing while improving efficiency. This, joined together with the absence of any stop motion at the top dead center and bottom dead center, further improves the efficiency.

With the dimensions set forth, the three elements of the generator, motor and rotary engine of FIG. 2 thus form a compact cylindrical shape with a single central drive shaft (8) —allowing the motor to be of an 8 hp pm type. With dimensions of 18 inch diameter and some 12 inches long, an approximate volume of the hybrid engine of some 700 cubic inches is attainable. With the dimensions of the engine rotor (without the discs) being of 10 inch diameter×6.5 inches long, a volume of approximately 200 cubic inches results. The motor and generator then could displace another 800 cubic inches, for an approximate overall volume of the entire system of only 1,500 cubic inches. With each of the four vanes 7 being some 5.5 inches long and with a width of 6.5 inches, a stroke of approximately 3 inches provides a single combustion chamber of approximately 50 cubic inches—such that with four vanes, a combined displacement of approximately 200 cubic inches, 3.3 liters, would then follow. Assuming the rotary engine efficiency at 100% as compared to standard engines, the 3.3 liter displacement would then be substantially increased to provide a large horsepower within an envelope some 10 times smaller than a conventional engine. (The rotary engine coupled to the motor and generator would continue to be more than 6 times smaller than a standard 6-cylinder stand-alone engine.) The absence of valves for the intake and exhaust will be understood to allow greater efficiency at higher revolutions, eliminating the parts and timing problems associated with conventional engines.

As will be understood, in the operation of the hybrid engine, the generator 12 constantly charges the batteries of the bank 17, while increasing revolutions during moments of deceleration increase the charging to the batteries and the braking forces to the drive shaft. As the electric motor 13 always assist the engine 14 primarily during the acceleration, but at the same time is always sensing the drive shaft load to react on demand, the electric motor 13 also assumes a primary driver to prevent battery over-charge.

As the rotary engine requires less combustion forces to achieve equal power of a standard piston engine because the spinning rotor mass develops power through kinetic energy forces much in the way the electric motor operates, the efficiency of the rotary engine in this invention would be much higher than that of a standard piston engine, which begins at 50%. With the modification to the vanes to provide enhanced displacement, a more stable operation is realizable in a smaller package, because of the elimination of the elimination of the previously utilized piston arms and their inherent side loading.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. A hybrid engine including an electric generator, an electric motor and a rotary internal combustion engine contained in an engine block, the rotary internal combustion engine comprising a cylindrical housing having an annular ring-like intermediate member defining an enclosed rotor chamber, a rotor in said chamber, a pair of end plates, a pair of actuators journaled one each on an internal surface of each of said end plates, a pair of fan discs journaled one each on an internal surface of each of said actuators, a shaft journaled in said end plates and extending through said actuators, said fan discs and said chamber fixed to said rotor, pivotal vanes on said rotor biased into engagement with said annular member forming intake, compression, combustion and exhaust chambers in said rotor chamber, first passageway means in said housing to admit fuel to said combustion chamber and air to said intake chamber, power means on said rotor for forcing said vanes into engagement with said annular wall comprising radially extending slots in said rotor and underlying said vanes, and second passageway means in said rotor connecting with said slots for exhausting gas from said combustion chamber when pivoting said vanes outwardly.

2. The engine of claim 1, including a plurality of fixed and actuating pins coupling said rotor through said fan discs and actuators to said end plates.

3. The engine of claim 2 wherein each of said fixed pins couples into the actuators through a double acting bearing.

4. The engine of claim 2 wherein each of said actuating pins is coupled to provide reciprocal action to each vane for each rotary revolution.

5. The engine of claim 2 wherein said rotor is provided with recesses in the periphery thereof for receiving said pivoted vanes.

6. The engine of claim 2 wherein said first passageway means include intake and exhaust ports in said annular member opening into said annular wall, and including purge means on said annular wall between the intake and exhaust ports for forcing said vanes to the retracted position and for sealing the area between said intake and exhaust ports.

7. The hybrid engine of claim 1 including a battery pack coupled with the generator and a drive shaft coupled with the rotor, and wherein said generator constantly charges said battery pack while increasing the charge thereto during moments of vehicle deceleration.

\* \* \* \* \*